United States Patent Office 3,386,724
Patented June 4, 1968

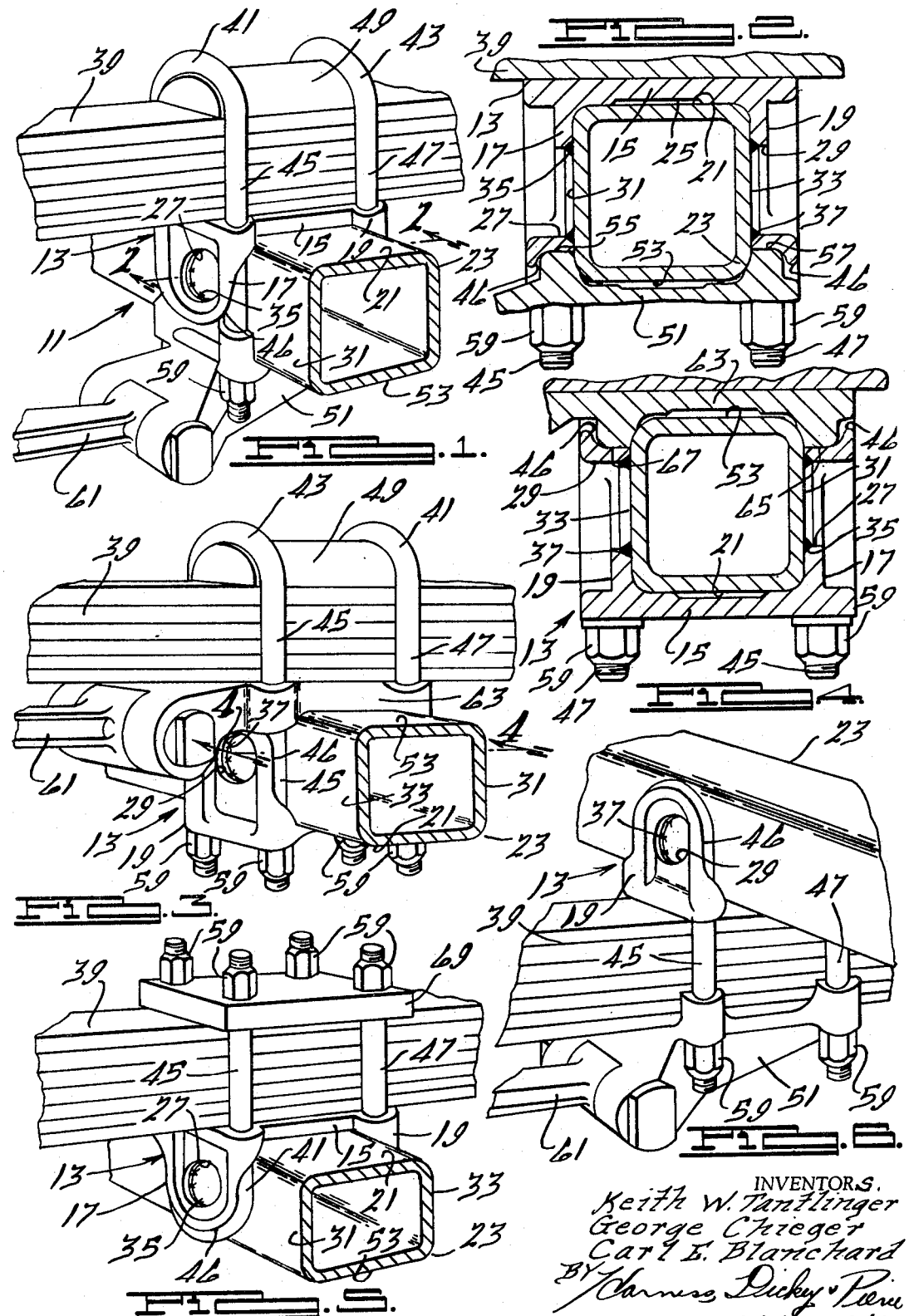

3,386,724
VEHICLE CONSTRUCTION SPRING-TO-AXLE MOUNTING
Keith W. Tantlinger, Grosse Pointe Shores, George Chieger, Birmingham, and Carl E. Blanchard, Grosse Pointe, Mich., assignors to Fruehauf Corporation, Detroit, Mich., a corporation of Michigan
Filed Nov. 4, 1965, Ser. No. 506,334
5 Claims. (Cl. 267—52)

ABSTRACT OF THE DISCLOSURE

A spring-to-axle mounting assembly comprising an axle tube having a pair of spaced parallel substantially vertically extending walls and a substantially horizontal wall extending laterally between the vertical walls; a bracket having a base overlying the horizontal wall of the axle tube and a pair of depending flanges extending parallel to and closely engaging the vertical walls of said axle tube, means on the lower side of the bracket defining a central relieved area and a pair of bearing surfaces substantially laterally aligned with and adapted to bear upon the upper edges of the side walls, whereby to leave the central portion of the horizontal wall substantially free from forces created upon vehicle loading, and means including plate means and bolt means removably securing the bracket and axle tube to a leaf-type suspension spring.

---

This invention relates to vehicle suspensions, and particularly to an improved spring-to-axle mounting.

The vehicles to which the present invention relates include those incorporating leaf-type suspension springs secured at an intermediate point to a vehicle axle. For example, relatively light, over-the-road trailers often utilize leaf-type suspension springs and are fixed to the trailer axle at an intermediate point on the spring by an assembly, called a spring-to-axle mounting. In these tractor-trailer combinations, tractive effort is transmitted through the springs to the trailer axle. Heavier tractor trailer installations require that the correspondingly relative heavy tractive effort be transmitted from the tractor to the trailer axle through radius rods connected at their ends to the trailer and to the trailer axle, respectively. These radius rods transmit tractive effort apart from the suspension springs and are conveniently secured to the axle tube at the spring-to-axle mounting. However, in either case, relatively heavy forces are exerted on the axle at the spring-to-axle mounting. In addition, the weight or trailer load forces exerted on the suspension springs are transmitted to the spring-to-axle mounting and impose a bending stress therein tending to break the connection between the mounting and the tube. Therefore, a spring-to-axle mounting which minimizes detrimental effect of tractive effort and trailer load forces on the axle and on the connection between the mounting and the tube and which does not exert any appreciable detrimental force of its own on the axle is highly desirable.

In addition, different tractor-trailer combinations utilize different radius rod and/or suspension spring positions and/or arrangements. Therefore, in addition to the above-described desirable load handling characteristics, a spring-to-axle mounting constructed for use in a variety of different spring suspension and/or radius rod positions and arrangements would be very advantageous.

Main objects, therefore, of the present invention are an improved spring-to-axle mounting which minimizes the detrimental effect of tractive effort and trailer load forces and which is adapted for use in a variety of different spring suspension and/or radius rod positions and/or arrangements.

Further objects include a spring-to-axle mounting of the above character constructed for use with or without a radius rod and adapted to secure the spring and axle tube together without imposing detrimental forces or stresses of its own on the axle tube.

Still further objects include a spring-to-axle mounting assembly of the above character which is relatively inexpensive to manufacture, rugged in construction and reliable in use.

Other objects and advantages of the present invention will become more apparent from a consideration of the following detailed description and claims taken in conjunction with the drawings in which:

FIGURE 1 is a fragmentary perspective view of a spring-to-axle mounting assembly embodying the present invention;

FIG. 2 is a sectional view of FIG. 1 taken along the line 2—2 thereof;

FIG. 3 is a view similar to FIG. 1 showing the present invention embodied in a different radius rod arrangement;

FIG. 4 is a sectional view of FIG. 3 taken along the line 4—4 thereof;

FIG. 5 is a view similar to FIGS. 1 and 3 illustrating an installation wherein no radius rod is used; and FIG. 6 is a view similar to FIGS. 1, 3 and 5 illustrating a still further spring and radius rod arrangement.

Broadly described, the present invention includes a bracket having a base overlying a horizontal surface of a transverse axle tube and a pair of depending flanges welded to the fore and aft sides of the axle tube wherein the bracket and axle tube are secured to a leaf-type suspension spring and to a radius rod, if one is used, through bolt means and a plate and wherein the forces exerted on the axle tube and on the welds through vehicle loading tractive effort and the bolt connection are minimized.

Referring now more particularly to the drawings and particularly FIGS. 1 and 2, a spring-to-axle mounting generally indicated at 11 is seen to include a bracket 13 having a base 15 and a pair of depending flanges 17, 19 extending laterally therefrom. The bracket base 15 overlies one horizontal wall 21 of an axle tube 23 which rotatably receives and supports an axle which extends transversely of the vehicle and accommodates wheels at its outer ends in the usual manner. As shown here, the axle tube 23 is generally rectangular in cross section and the bracket base 15 has a central relief area 25 so as to engage the tube wall 21 only at its ends. The flanges 17, 19 are apertured at 27, 29 and closely engage opposed axle tube side walls 31, 33, which are fore and aft, respectively, and are secured thereto by welds 35, 37 extending around the apertures.

The bracket base 15 is adapted to receive and support, at its upper surface, an intermediate portion of a leaf-type vehicle suspension spring 39 which extends longitudinally of the vehicle. Generally, a plurality of springs 39 is used and it is to be understood that each is secured to the tube 23 in a spring-to-axle mounting 11. Since these mountings are identical, only one is described. Thus, each of the springs 39 is supported at either end on the underside of the vehicle in the usual manner and is secured to its bracket 13 by spaced U-bolts 41, 43 passing over the spring 39 and having their legs 45, 47 extending through openings in the bracket base 15. A generally semi-cylindrical block 49 is interposed between the base of the U-bolts 41, 43 and the upper surface of the spring 39 to equally distribute U-bolt forces thereon.

The outer edge of each of the bracket flanges 17, 19 flares outwardly at 46 to freely receive the legs 45, 47 of the U-bolts 41, 43. In the embodiment illustrated in FIGS. 1 and 2, the ends of the legs 45, 47 extend through a plate 51 overlying a bottom wall 53 of the axle tube 23. The plate 51 has a pair of depending side flanges 55, 57 engaging the end of the bracket flanges 17, 19, respectively, at the ends of the flanges 17, 19 and within the flared portions 46. A nut 59 is threaded on the end of each U-bolt leg 45, 47 and removably holds the plate 51 in position. In this arrangement, the forward end of the plate 51 accommodates a radius rod 61 secured at its other end to the vehicle tractor chassis in the usual manner.

In use, vehicle load is supported by the spring 39 and is transferred to the bracket base 15 and to the axle tube 23. Since the bracket base 15 is relieved at 25, this load is directed on the axle tube upper wall 21 at its strongest area which is at its outer edges where it joins with and is reinforced by the tube side walls 31, 33. The unsupported mid-section of the tube wall 21 is substantially free of forces from vehicle loading because of the relief area 25. This, in turn, serves to minimize the detrimental effect of vehicle loading forces in the axle tube 23 since all or substantially all of these forces are directed on the axle tube at its strongest areas.

In addition, substantially all the forces exerted by the U-bolts 41, 43 in securing the tube 23 and spring 39 together are absorbed by the bracket 13, the plate 51 and the spring 39. Thus, as shown in FIG. 2, the flanges 55, 57 of the plate 51 engage the ends of the flanges 17, 19 within the flared portions 46 and a small amount of clearance is provided between axle tube lower wall 53 and the plate 51. Therefore, U-bolt tension, when the nuts 59 are tightened, results in compressive forces on the spring 39 and bracket base 15 and upon the bracket flanges 17, 19 and flanges 55, 57 only. Since the plate 51 engages only the bracket flanges 17, 19 and not the axle tube 23, no compressive forces arising from U-bolt tension are exerted on the axle tube which might otherwise crush the tube side walls 31, 33.

Furthermore, the welds 35, 37 which secure the bracket 13 to the axle tube 23 are subjected to minimal stresses arising from vehicle loading and from U-bolt tension. Thus, as described above, vertical vehicle loading forces and axle reaction forces reflect maximum stress at the area of contact between the bracket base 15 and the outer edges of the axle tube upper wall 21. Since the tube upper wall 21 and the bracket base 15 are in contact at these areas, the tube and bracket cannot move relative to each other and virtually none of the stresses arising from vehicle loading forces are actually exerted on the welds 35, 37. Forces arising from U-bolt tension are, as described above, absorbed at the contact areas of the bracket flanges 17, 19 and the plate flanges 55, 57. None of these forces are exerted on the axle tube 23 and there is, therefore, no tendency to move the axle tube relative to the bracket 13.

Tractive effort, in this arrangement, is transmitted from the tractor to the trailer through the radius rod 61. The forces developed thereby are transmitted laterally to the axle tube 23 through either the flange 55 or the flange 57 of the plate 51, depending on the direction of vehicle movement, at the area of juncture between bottom wall 53 and the side walls 31, 33. This, again, is a relatively strong area of the axle tube 23 easily able to absorb these forces without bending or crushing the axle tube. Preferably, only a small amount of clearance exists between the plate flanges 55, 57 and the tube side walls 31, 33 so that the plate 51 does not move sufficiently during transmission of tractive effort to tend to pull either the flange 17 or the flange 19 of the bracket 13 away from the axle tube. Thus, tractive effort is transmitted to the axle tube 23 without imposing forces tending to break the welds 35, 37.

The present invention contemplates that the axle tube 23 and bracket 13 will be fabricated as a unit with the bracket 13 already welded in place as shown. Thus, to complete the spring-to-axle mounting, it is only necessary to locate the plate 51 under the axle tube 23, drop the U-bolts 41, 43 in place over the spring 39 with their legs 45, 47 extending through the bracket 13 and the plate 51 and thread the nuts 59 on the ends of the U-bolt legs.

The arrangement of FIGS. 3 and 4 illustrates the same axle tube 23 and bracket 13 as shown in FIGS. 1 and 2 and differs structurally from that of FIGS. 1 and 2 only in the particular plate and radius rod configuration. The axle tube 23 and bracket 13 in FIGS. 3 and 4 is reversed or oriented 180° from that in FIGS. 1 and 2 so that the wall 21 now is the axle tube bottom wall and the bracket base 15 extends across the bottom of the axle tube 23. This arrangement is adapted for use with a different radius rod configuration from that of FIGS. 1 and 2. However, the structural details and weld arrangement of the axle tube 23 and bracket 13 are identical in FIGS. 1 and 2 and in FIGS. 3 and 4.

The plate of the embodiment of FIGS. 3 and 4 is shown at 63 and overlies what is now the axle tube top wall 53. This plate 63 is formed with depending flanges 65, 67 which closely engage the tube side walls 31, 33 and abut the ends of the bracket flanges 17, 19 much the same as the flanges 55, 57 of the plate 51 in the embodiment of FIGS. 1 and 2. The top surface of the plate 63 is flattened to receive and support the spring 39. The U-bolts 41, 43 hold the assembly together and, as shown, have their legs 45, 47 extending through openings in the plate 63 and in the bracket base 15. The nuts 59 are threaded on the ends of the legs 45, 47 and in this arrangement engage the bracket base 15 holding the parts together. As with the plate 51 of FIGS. 1 and 2, the plate 63 accommodates the radius rod 61.

In this embodiment, vehicle loading forces exerted on the spring 39 are transferred to the plate 63 and are absorbed by the abutting flanges 17, 19 and 65, 67. Since the plate 63 is spaced slightly from the axle tube wall 53 when the flanges 65, 67 engage flanges 17, 19, substantially none of the vehicle load forces are directed on the axle tube here. In addition, the flanges 65, 67 of the plate 63 are positioned to closely engage the tube side walls 31, 33 adjacent their ends which are supported by the top wall 53. Thus, tractive effort is transmitted to the axle tube at these areas as was the case in the arrangement of FIGS. 1 and 2 and there is no tendency for the welds 35, 37 to break as a result of tractive effort forces.

As was the case with the arrangement of FIGS. 1 and 2, substantially all the forces created by tension of the U-bolts 41, 43 holding the parts together are absorbed by the spring 39 and by the abutting flanges of the bracket 13 and the plate 63. Since there is a small amount of clearance between the plate 63 and the axle tube 23, none of this force is exerted on the axle tube. Furthermore, as was the case in the arrangement of FIGS. 1 and 2, the stresses developed on the welds 35, 37 in FIGS. 3 and 4 arising from vehicle load and U-bolt tension is minimized, since virtually all these load forces are absorbed in the abutting flanges 17, 19 and 65, 67 and do not tend to move the bracket 13 and the axle tube 23 relative to each other.

The arrangement of FIG. 5, depicts a spring-to-axle mounting for a relatively light vehicle which requires no radius rod to transmit tractive effort from the tractor to the trailer axle tube. In this arrangement, the same axle tube 23 and bracket 13 are used as was described above in the arrangements of FIGS. 1 and 2 and FIGS. 3 and 4. In the arrangement of FIG. 5, the orientation of the axle tube 23 and bracket 13 is the same as in FIGS. 1 and 2. However, here no plate of the type shown in FIGS. 1–4 is required since no radius rod is used. Therefore, a simple plate, such as is shown at 69, is used to provide backing for the U-bolt nuts 59 and hold the parts together. In this arrangement, the U-bolts 41, 43 are disposed in the flared ends 46 of the bracket flanges 17, 19 and the nuts 59 hold the plate 69, spring 39 and bracket 13 together. By mounting the U-bolts in the flared ends 46 of the bracket flanges 17, 19 as shown, they exert no forces on the axle tube 23 whatever. Furthermore, as in the arrangement of FIGS. 1 and 2, the vehicle load forces are directed on the axle tube 23 at the outer strong edges of the tube top wall 21 and the stresses developed thereby at the welds 35, 37 are minimized, since the axle tube 33 and the bracket 13 do not tend to move relative to each other. In this arrangement, tractive effort is transmitted through the spring 39 and to the axle tube 23 through the bracket 13 whose flanges 17, 19 engage the tube side walls 31, 33 at their ends supported by the tube wall 21.

The arrangement of FIG. 6 depicts an underslung assembly or one where the spring 39 is located below the axle tube 23. This arrangement is particularly advantageous where it is desired to provide that the floor of the vehicle be as close to the ground as possible. To this end, the spring-to-axle mounting here is constructed so that none of the components thereof is above the axle tube 23. Thus, the axle tube 23 and the bracket 13 are oriented as they are in the arrangement of FIGS. 3 and 4. The spring 39 is disposed below the bracket 13 and held against the base 15 by a plate 51 which can be the same as the one shown at 51 in FIGS. 1 and 2. The U-bolts 41, 43 are mounted the same as in FIG. 5 and the nuts 59 engage the plate 51 and hold the parts together. Thus, no crushing forces are developed on the axle tube 23 or on the welds 35, 37 by U-bolt tension, and the vehicle loading forces are transmitted from the spring 39 to the bracket 13 away from the axle tube 23. Tractive effort here is transmitted to the bracket plate 51 and to the axle tube 23 through the bracket flanges 17, 19 which engage the side walls at their supported end adjacent the bottom wall 21 and the welds 35, 37 remain virtually unaffected by and of these forces.

By the present invention, there has been provided an improved spring-to-axle mounting assembly calculated to fulfill the objects hereinabove set forth and while a preferred embodiment of the present invention has been illustrated and described in detail, various additions, substitutions, modifications and omissions may be made thereto without departing from the spirit of the invention as encompassed by the appended claims.

What is claimed it:

1. A spring-to-axle mounting assembly comprising an axle tube having a pair of spaced parallel substantially vertically extending walls and a substantially horizontal wall extending laterally between said vertical walls, a backet having a base overlying said horizontal wall of said axle tube and a pair of depending flanges extending parallel to and closely engaging said vertical walls of said axle tube, means on the lower side of said bracket defining a central relieved area and a pair of bearing surfaces substantially laterally aligned with the adapted to bear upon the upper edges of said side walls, whereby to leave the central portion of said horizontal wall substantially free from forces created upon vehicle loading, and means including plate means and bolt means removably securing said bracket and axle tube to a leaf-type suspension spring.

2. A spring-to-axle mounting assembly as claimed in claim 1 wherein said plate means and said bolt means include a plate spaced from the other horizontal wall of said axle tube and having flanges abutting said bracket flanges and a pair of U-bolts extending through said bracket and said plate removably securing said bracket, axle tube and plate to a leaf-type suspension spring.

3. A spring-to-axle mounting assembly as claimed in claim 1 wherein said flanges on said base are arcuately shaped at their ends and are provided with laterally flared edges and wherein said plate means and said bolt means inculde a plate spaced from the other horizontal wall of said axle tube and having flanges engaging said vertical walls and abutting said bracket flanges within the flared edges and a pair of U-bolts extending through said bracket within said flared edges and through said plate removably securing the bracket, axle tube and plate to a leaf-type suspension spring.

4. A spring-to-axle mounting assembly as claimed in claim 1 wherein said bracket base has a leaf-type suspension spring seated thereon and wherein said plate means and said bolt means include a plate overlying said suspension spring opposite the bracket base and a pair of U-bolts extending through said bracket base and said plate removably securing said bracket and axle tube to said leaf-type suspension spring.

5. A spring-to-axial mounting assembly as claimed in claim 4 wherein said flanges are arcuately shaped at their ends and are formed with laterally flared edges and wherein said U-bolts engage said flange ends and are within said flared edges.

References Cited

UNITED STATES PATENTS

| | | | |
|---|---|---|---|
| 1,872,196 | 8/1932 | Urschel | 267—52 |
| 2,559,103 | 7/1951 | Anderson | 267—52 |
| 2,745,661 | 5/1956 | Van Raden | 267—52 |
| 2,754,111 | 7/1956 | Norrie | 267—52 |

ARTHUR L. LA POINT, *Primary Examiner.*

R. M. WOHLFARTH, *Assistant Examiner.*